(12) United States Patent
Yamazaki et al.

(10) Patent No.: US 12,146,735 B2
(45) Date of Patent: Nov. 19, 2024

(54) VEHICLE WITH ROAD SURFACE CONDITION DETECTOR

(71) Applicant: HONDA MOTOR CO., LTD., Tokyo (JP)

(72) Inventors: Ryosuke Yamazaki, Wako (JP); Takashi Yanagi, Wako (JP); Kazuya Konada, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 162 days.

(21) Appl. No.: 17/681,716

(22) Filed: Feb. 26, 2022

(65) Prior Publication Data

US 2022/0290984 A1    Sep. 15, 2022

(30) Foreign Application Priority Data

Mar. 10, 2021 (JP) .................. 2021-038070

(51) Int. Cl.
*G01B 11/30* (2006.01)
*B60G 17/0165* (2006.01)
*B60W 40/06* (2012.01)

(52) U.S. Cl.
CPC ........ *G01B 11/303* (2013.01); *B60G 17/0165* (2013.01); *B60G 2400/0512* (2013.01); *B60G 2400/82* (2013.01); *B60G 2401/21* (2013.01); *B60W 40/06* (2013.01)

(58) Field of Classification Search
CPC .............. G01B 11/303; B60G 17/0165; B60G 2400/0512; B60G 2400/82; B60G 2401/21; B60W 2420/62; B60W 40/06

USPC .......................................................... 73/146
See application file for complete search history.

(56) References Cited

U.S. PATENT DOCUMENTS 5,075,772 A * 12/1991 Gebel ..................... G01C 7/04
                                                                  348/135
5,497,325 A     3/1996 Mine
6,157,294 A * 12/2000 Urai ..................... G01S 17/875
                                                                  340/435

(Continued)

FOREIGN PATENT DOCUMENTS

JP      S60-142207 A      7/1985
JP        61135811 A  *   6/1986

(Continued)

OTHER PUBLICATIONS

Translation JP-2018108791 (Year: 2018).*

(Continued)

*Primary Examiner* — Peter J Macchiarolo
*Assistant Examiner* — Monica S Young
(74) *Attorney, Agent, or Firm* — Rankin, Hill & Clark LLP

(57) ABSTRACT

A vehicle includes: a vehicle body; front and rear wheels configured to move the vehicle body; and a road surface condition detector configured to detect road surface conditions in front of each of the front wheels, wherein the road surface condition detector is positioned in front of each of the front wheels, and a direction of radiating laser beams by the road surface condition detector for detecting a detection point on a road surface is inclined in a direction of a tangent to an arc, about a pitch center of the vehicle body and running through the detection point, at the detection point, when the vehicle body is viewed laterally.

2 Claims, 9 Drawing Sheets

(56) References Cited

U.S. PATENT DOCUMENTS

| | | | |
|---|---|---|---|
| 11,726,184 B2* | 8/2023 | Ferreira | ............... G01S 7/4815 356/4.01 |
| 2015/0174981 A1* | 6/2015 | Buma | ............... B60G 17/0182 348/148 |

FOREIGN PATENT DOCUMENTS

| | | | | | |
|---|---|---|---|---|---|
| JP | S61-135811 | A | | 6/1986 | |
| JP | H06-106950 | A | | 4/1994 | |
| JP | 2013205196 | A | * | 10/2013 | |
| JP | 2016166885 | A | * | 9/2016 | ......... B60G 17/0165 |
| JP | 2018108791 | A | * | 7/2018 | |

OTHER PUBLICATIONS

Translation JP-2016166885 (Year: 2016).*
Office Action received in corresponding Japanese application No. 2021-038070 dated Aug. 2, 2022 with English translation (10 pages).

\* cited by examiner

Front ⟷ Rear

VEHICLE WITH ROAD SURFACE CONDITION DETECTOR

CROSS-REFERENCE TO RELATED APPLICATION

This application claims the benefit of priority to Japanese Patent Application No. 2021-038070 filed on Mar. 10, 2021, the disclosures of all of which are hereby incorporated by reference in their entireties.

TECHNICAL FIELD

The present invention relates to a vehicle with a road surface condition detector.

BACKGROUND OF THE INVENTION

A conventional vehicle detects conditions of a road surface to be followed by wheels, to control the vehicle for comfortable riding. There are two methods of detecting road surface conditions by a conventional road surface condition detection sensor. First one is to mount a sensor at above a front window, to detect road surface conditions in front of the vehicle. Second one is to mount a sensor at a bumper, to detect road surface conditions right below the vehicle.

For example, in Japanese Patent Application Publication No. 2013-205196 (hereinafter, referred to as Patent Document 1; see FIGS. 1 to 4, paragraphs 0015, 0016), a projector 12 and a camera 18, provided in vicinity to a front bumper, are used to estimate road surface conditions in front of a vehicle 10. According to the disclosure, the projector 12 uses a projection controller 24 to control on-off of projecting a reference pattern or adjust radiation intensity depending on environmental conditions.

SUMMARY OF THE INVENTION

Problems to be Solved

However, with the invention of Patent Document 1, detection points on the road surface are displaced in a front-rear direction when the vehicle experiences a pitching motion. In this case, there is a change in a distance between the detection points and wheels, to have a risk of having an error. For example, there can be a difference between said distance, when a sensor has detected a hubbly road surface, and said distance, when the wheels run over the hubbly road surface, even with the vehicle traveling at the same speed, and this leads to a gap in traveling time to cause an error when an electromagnetic damper of a suspension is controlled. The distance between the detection points and the wheels thus need to be corrected with control thereover. In other words, calculations need to be done to correct the error.

In contrast, in a case where a sensor is mounted at a bumper to detect points right below a vehicle, changes in a distance from wheels to road surface detection points are smaller than those in Patent Document 1, when the vehicle experiences a pitching motion, but there is still an error. The present invention has been invented in view of above-described situations, and is intended to provide a vehicle with an error, in changes in a distance between road surface detection points and wheels, reduced to improve controllability.

Solution to Problem

In order to solve the above-identified problem, a vehicle with a road surface condition detector according to a first aspect of the present invention includes: a vehicle body; front and rear wheels configured to move the vehicle body; and a road surface condition detector configured to detect road surface conditions in front of each of the front wheels, wherein the road surface condition detector is positioned in front of each of the front wheels, and a direction of radiating laser beams by the road surface condition detector for detecting a detection point on a road surface is inclined in a direction of a tangent to an arc, about a pitch center of the vehicle body and running through the detection point, at the detection point, when the vehicle body is viewed laterally.

A vehicle with a road surface condition detector according to a second aspect of the present invention includes: a vehicle body; front and rear wheels configured to move the vehicle body; and a road surface condition detector configured to detect road surface conditions in front of each of the rear wheels, wherein the road surface condition detector is positioned in front of each of the rear wheels, and a direction of radiating laser beams by the road surface condition detector for detecting a detection point on a road surface is inclined in a direction of a tangent to an arc, about a pitch center of the vehicle body and running through the detection point, at the detection point, when the vehicle body is viewed laterally.

Advantageous Effects of the Invention

The present invention provides a vehicle with an error, in changes in a distance between a detection point on a road surface and wheels, reduced to improve controllability.

EMBODIMENTS OF THE INVENTION

Figure 1A:
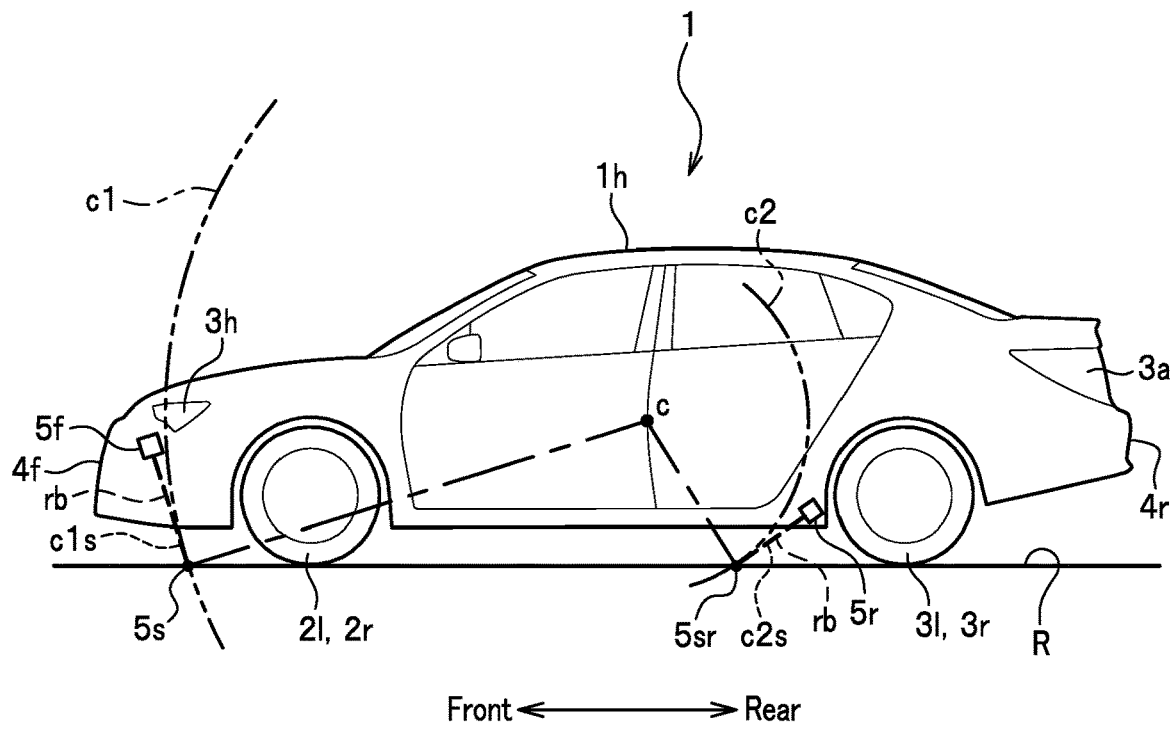
FIG. 1A is a conceptual side view of a vehicle according to an embodiment of the present invention.
Figure 1B:
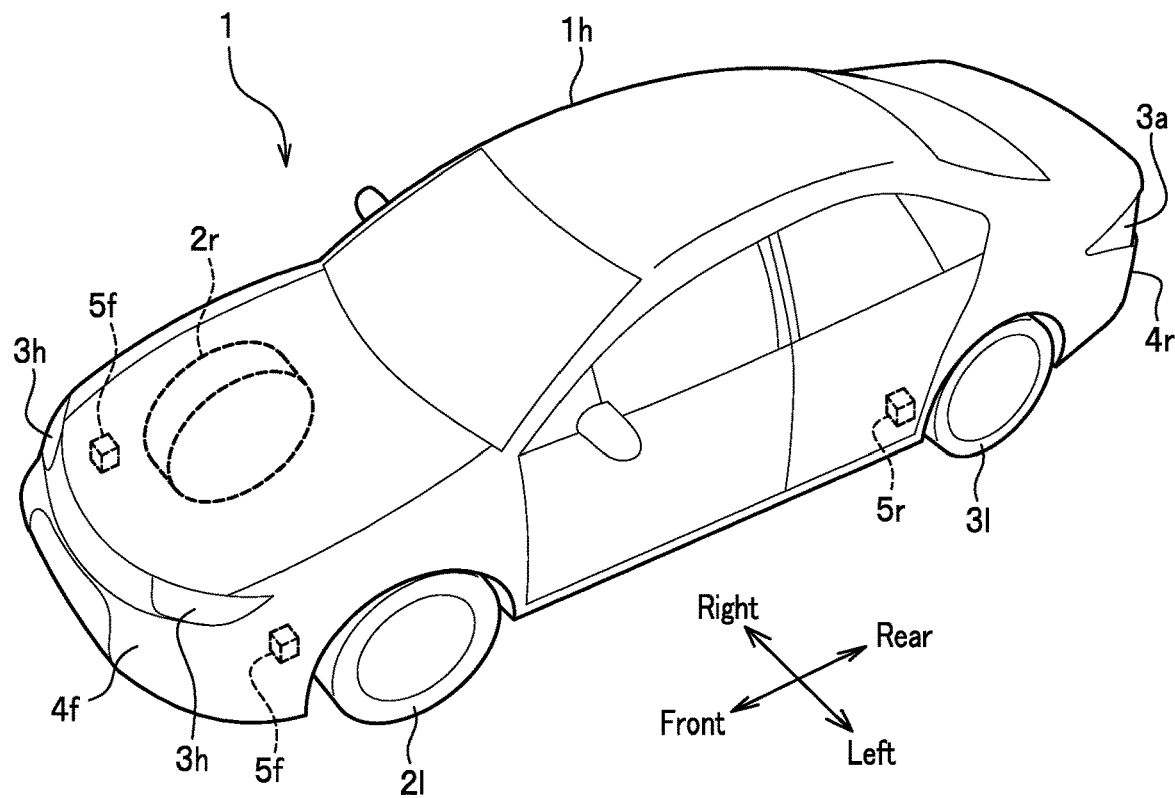
FIG. 1B is a perspective view of the vehicle according to the embodiment.

Hereinafter, a description is given in detail of an embodiment of the present invention, with reference to the drawings as required. FIG. 1A is a conceptual side view of a vehicle 1 according to an embodiment of the present invention, and FIG. 1B is a perspective view of the vehicle 1 according to the embodiment. The present invention relates to a sensing direction for detecting road conditions by preview sensors 5f, 5r of the vehicle 1. The preview sensors 5f, 5r use laser beams or the like for the detection. The vehicle 1 of the present embodiment includes a right front wheel 2r and a left front wheel 2l, as steering wheels to change a moving direction of the vehicle 1, at a front thereof. The vehicle 1 includes a right rear wheel 3r and a left rear wheel 3l, as driven wheels or driving wheels, at a rear thereof.

A vehicle body 1h supported by the wheels 2r, 2l, 3r, 3l of the vehicle 1 is configured to have one or more passengers therein. The vehicle 1 is provided, on a front thereof, with a headlight 3h to irradiate a road surface R to come, and is provided, on a rear thereof, with a rear light 3a to irradiate the road surface R to go. The vehicle 1 is also provided, at a front and a rear thereof, with a front bumper 4f and a rear bumper 4r each configured to absorb impact from a collision at the front or the rear.

The vehicle 1 has the preview sensor 5f provided at a position overlapping with the right front wheel 2r, when viewed from front, as shown in FIG. 1B. The vehicle 1 also has the preview sensor 5f provided at a position overlapping with the left front wheel 2l, when viewed from front. The preview sensors 5f are provided at positions without any misalignment in a vehicle width direction with respect to, and overlapping with, the front wheels 2r, 2l, respectively, as viewed from front. This allows for more precisely detecting conditions of a road surface to be followed by the front wheels 2r, 2l.

Likewise, the vehicle 1 has the preview sensor 5r provided at a position overlapping with the right rear wheel 3r, when viewed from front. The vehicle 1 also has the preview sensor 5r provided at a position overlapping with the left rear wheel 3l, when viewed from front. The preview sensors 5r are provided at positions without any misalignment in a vehicle width direction with respect to, and overlapping with, the rear wheels 3r, 3l, respectively, as viewed from front. This allows for more precisely detecting road surface conditions followed by the rear wheels 3r, 3l. Used as the preview sensors 5f, 5r are sensors such as radars, cameras, and laser devices, or other sensors. The preview sensors 5f, 5r can be any sensors as far as they can detect road surface conditions.

A description is given of the embodiment with sensors using laser devices, as the preview sensors 5f, 5r, by way of example. For detecting conditions of the road surface R, the preview sensors 5f, 5r are configured to radiate laser beams rb toward the road surface R (see FIG. 1A), as described below, to detect a distance therefrom to the road surface (road surface condition).

Figure 2:
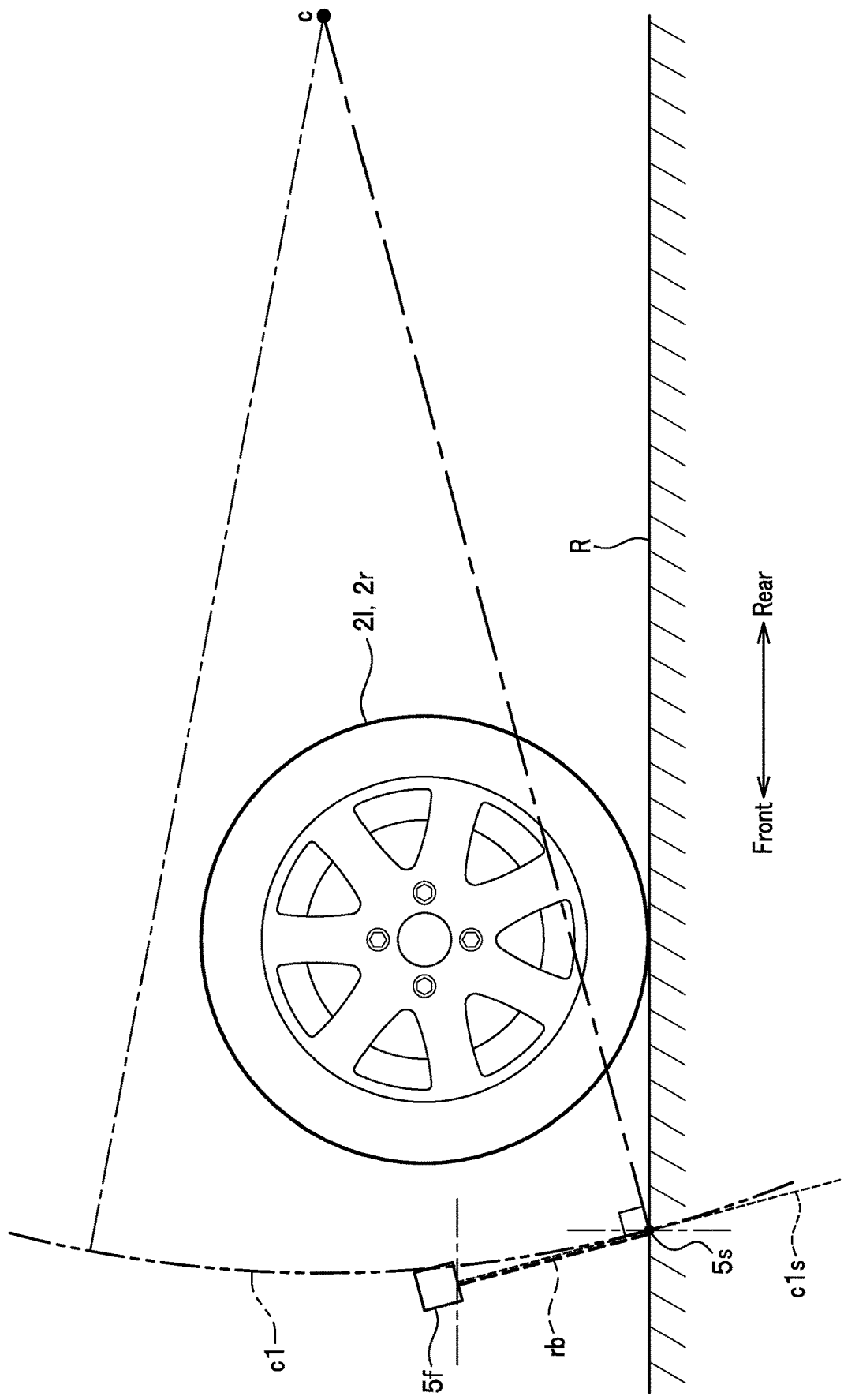
FIG. 2 is a conceptual side view of the vehicle of the embodiment, to show positional relationships between a pitch center, a front wheel, and a detection point on a road surface detected by a preview sensor.

The vehicle 1 (vehicle body 1h) has a pitch center c with respect to the road surface R, when the vehicle 1 is in a standstill as shown in FIG. 1A. FIG. 2 is a conceptual side view of the vehicle 1 according to the embodiment to show positional relationships between the pitch center c, the front wheels 2r, 2l, and detection points 5s, 5sr on the road surface R detected by the preview sensors 5f, 5r. An arc c1 is drawn about the pitch center c of the vehicle 1, so as to run through the detection point 5s on the road surface R irradiated with the laser beams rb from the preview sensors 5f. A tangent c1s is then drawn to the arc c1 at the detection point 5s.

The direction of radiating the laser beams rb is set in this manner, when the vehicle 1 is in a standstill, to that of the tangent c1s to the arc c1 at the detection point 5s. In other words, the direction of radiating the laser beams rb from the preview sensors 5f is set, when the vehicle 1 is in a standstill as shown in FIG. 1A, to that of the tangent c1s to the arc c1, about the pitch center c of the vehicle 1 and running through the detection point 5s, at the detection point 5s.

That is, the direction of radiating the laser beams rb from the preview sensors 5f is inclined in that of the tangent to the arc c1, about the pitch center c of the vehicle 1, at the detection point 5s. In other words, the direction of radiating the laser beams rb from the preview sensors 5f is in line with that of the tangent c1s to the arc c1, about the pitch center c of the vehicle 1, at the detection point 5s. This causes the vehicle 1 to have the direction of radiating the laser beams rb for detecting conditions of the road surface R set to that of the tangent to the arc c1, about the pitch center c, at the detection point 5s, to detect conditions of the road surface R.

Likewise, an arc c2 is drawn about the pitch center c of the vehicle 1, so as to run through the detection point 5s on the road surface R irradiated with the laser beams rb from the preview sensors 5r. A tangent c2s is then drawn to the arc c2 at the detection point 5sr.

The direction of radiating the laser beams rb is set in this manner, when the vehicle 1 is in a standstill, to that of the tangent c2s to the arc c2 at the detection point 5sr. In other words, the direction of radiating the laser beams rb from the preview sensors 5r is set, when the vehicle 1 is in a standstill as shown in FIG. 1A, to that of the tangent c2s to the arc c2, about the pitch center c of the vehicle 1, at the detection point 5sr.

That is, the direction of radiating the laser beams rb from the preview sensors 5r is inclined in that of the tangent to the arc c2, about the pitch center c of the vehicle 1, at the detection point 5sr. In other words, the direction of radiating the laser beams rb from the preview sensors 5r is in line with that of the tangent c2s to the arc c2, about the pitch center c of the vehicle 1, at the detection point 5sr. This causes the vehicle 1 to have the direction of radiating the laser beams rb for detecting conditions of the road surface R set to that of the tangent to the arc c2, about the pitch center c, at the detection point 5sr, to detect conditions of the road surface R.

Here, the rear preview sensor 5r executes detection in the same manner as the front preview sensor 5f. Then, the preview sensor 5f is described below, but a description of the preview sensor 5r is omitted.

Figure 3A:
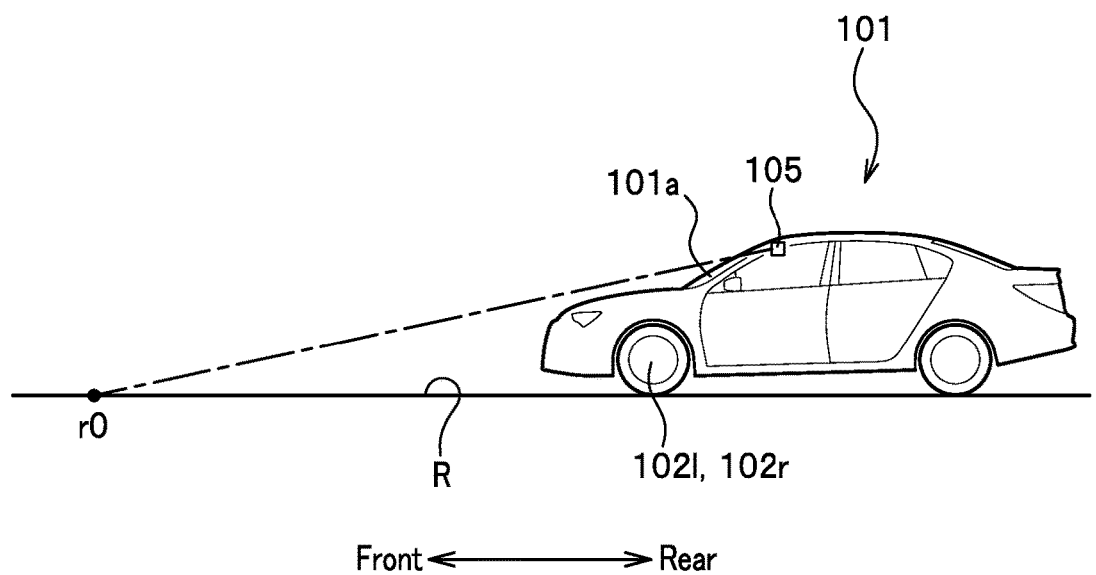
FIG. 3A is a conceptual side view of a vehicle having a preview sensor of Comparative Example 1, to show a relationship between the vehicle and a detection point on a road surface detected by a road surface condition detection sensor.
Figure 3B:
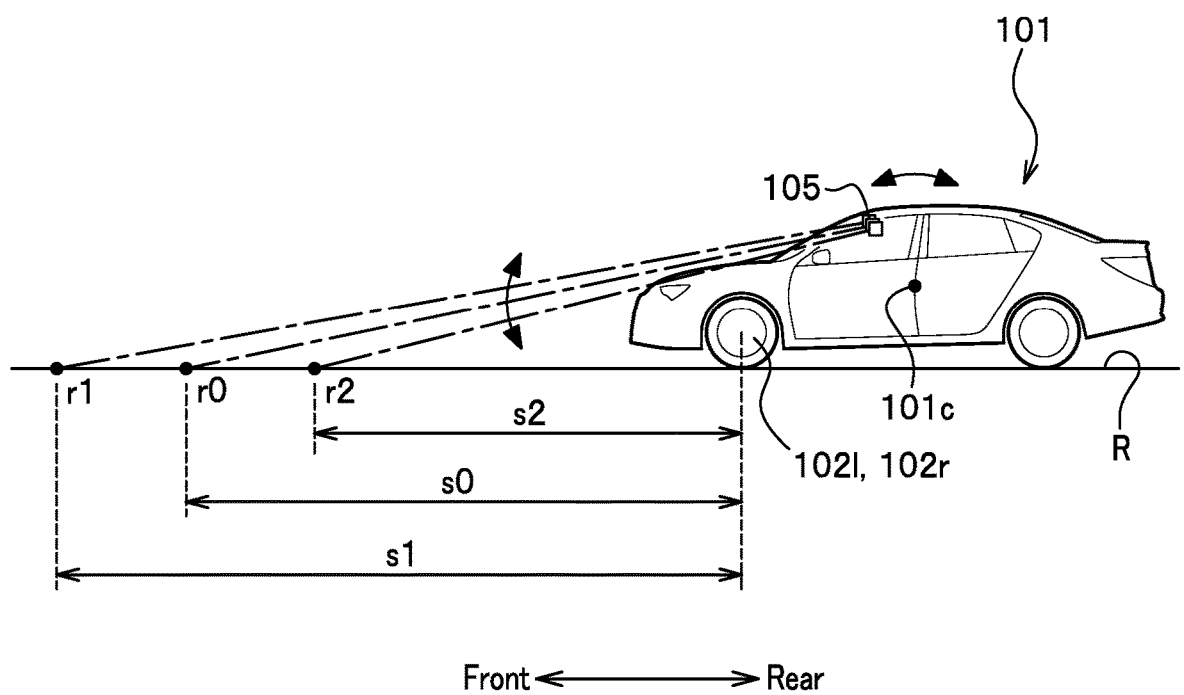
FIG. 3B is a conceptual side view of the vehicle of Comparative Example 1, to show displacement of the detection point on the road surface detected by the road surface condition detection sensor, when the vehicle experiences a pitching motion.

Change in Distance from Front Wheel to Detection Point on Road Surface, when Vehicle of Comparative Example 1 Experiences Pitching Motion Descriptions are given below of Comparative Examples 1, 2. FIG. 3A is a conceptual side view of a vehicle 101 having a road surface condition detection sensor 105 of Comparative Example 1, to show a relationship between the vehicle 101 and a detection point r0 on the road surface R detected by the road surface condition detection sensor 105. FIG. 3B is a conceptual side view of the vehicle 101 of Comparative Example 1, to show displacement of a detection point r0 on the road surface R detected by the road surface condition detection sensor 105, when the vehicle 1 experiences a pitching motion.

The vehicle 101 of Comparative Example 1 has the road surface condition detection sensor 105 mounted at above a front window 101*a*, as shown in FIG. 3A. The vehicle 101 has the detection point r0 set on the road surface R, to be detected by the road surface condition detection sensor 105 when the vehicle 101 is in a standstill. The road surface condition detection sensor 105 uses the laser beams rb to detect the detection point r0 on the road surface R in front of the vehicle 101 for detecting road surface conditions. In this case, a distance from front wheels 102*r*, 102*l* to the detection point r0, as a detected road surface position, is s0.

With the vehicle 101 experiencing a pitching motion about a pitch center 101*c*, the detection point r0 detected by the road surface condition detection sensor 105 displaces in a range between a detection point r1 and a detection point r2, as shown in FIG. 3B. This causes the distance s0 to be changed between a distance s1 to the detection point r1, as a detected road surface position, and a distance s2 to the detection point r2, as a detected road surface position, from the front wheels 102*r*, 102*l*. Thus, in order to detect road surface conditions for accurate control, correction is required for a distance between the distance s1 to the detection point r1, as a detected road surface position, and the distance s2 to the detection point s2*a*, as a detected road surface position, from the front wheels 102*r*, 102*l*, based on a difference from the distance s0 at the detection point r0.

Figure 4:
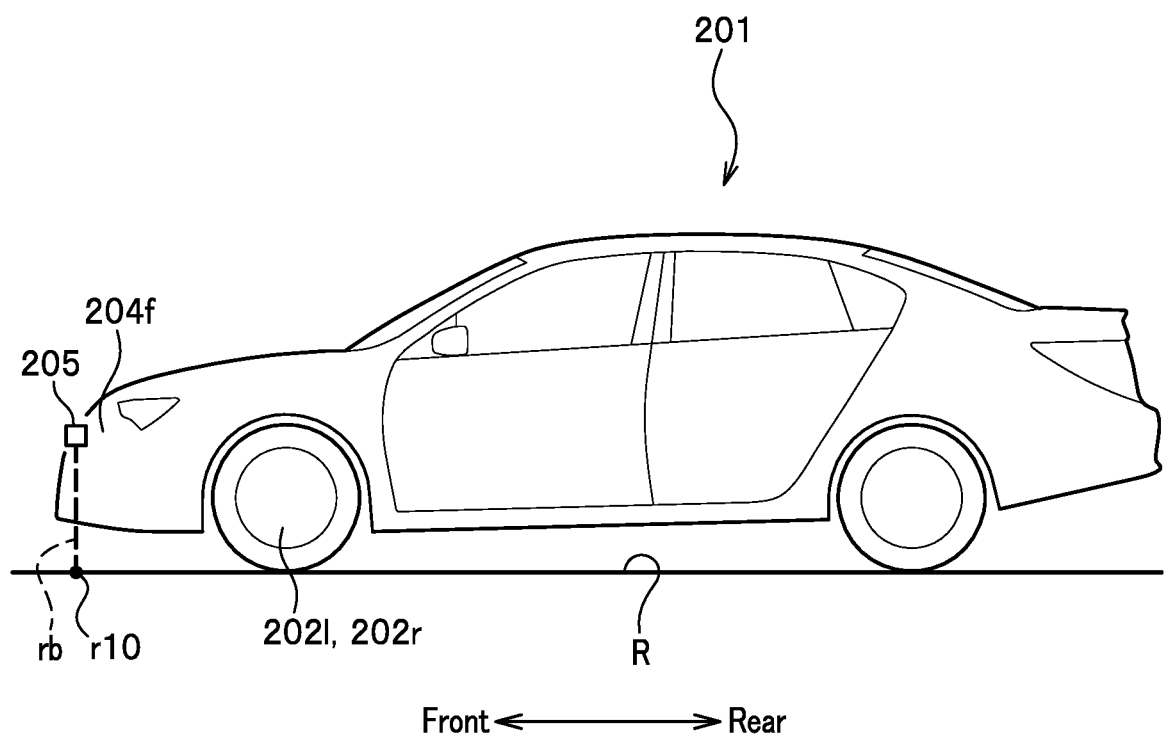
FIG. 4 is a conceptual side view of a vehicle having a preview sensor of Comparative Example 2, to show a relationship between the vehicle and a detection point on a road surface detected by a road surface condition detection sensor.

Change in Distance from Front Wheel to Detection Point on Road Surface, when Vehicle of Comparative Example 2 Experiences Pitching Motion FIG. 4 is a conceptual side view of a vehicle 201 having a road surface condition detection sensor 205 of Comparative Example 2, to show a relationship between the vehicle 201 and a detection point r10 on the road surface R detected by the road surface condition detection sensor 205. The vehicle 201 of Comparative Example 2 has the road surface condition detection sensor 205 mounted at a front bumper 204*f*, to detect the road surface R right therebelow.

Figure 5A:
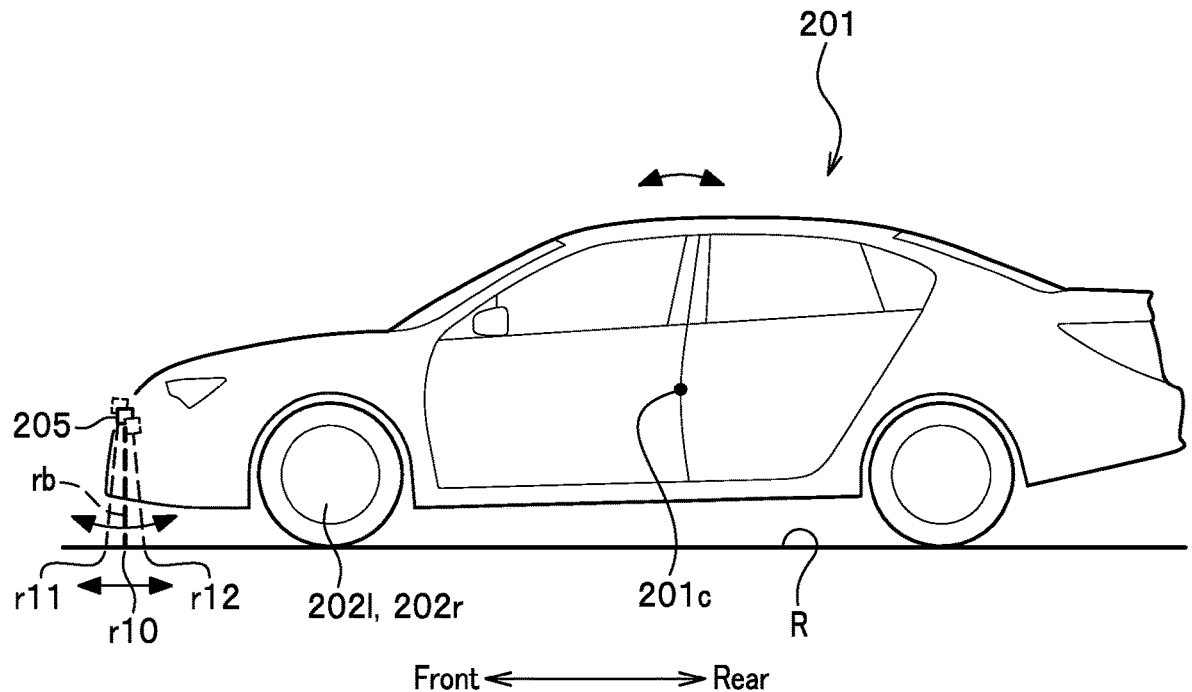
FIG. 5A is a conceptual side view of the vehicle of Comparative Example 2, to show displacement of the detection point on the road surface detected by a preview sensor, when the vehicle experiences a pitching motion.
Figure 5B:
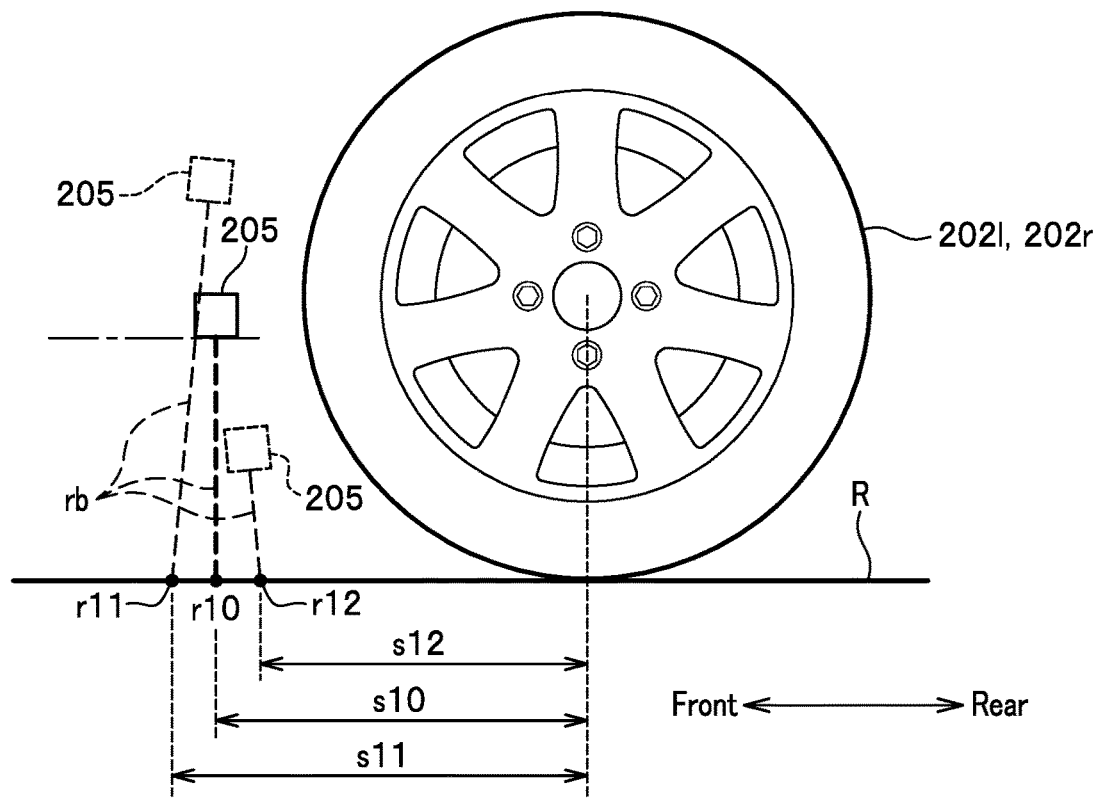
FIG. 5B is an enlarged side view to show positional relationships between the detection points and the front wheel in FIG. 5A for Comparative Example 2.

The road surface condition detection sensor 205 is configured to use the laser beams rb to detect the detection point r10 on the road surface R right below the vehicle 201. FIG. 5A is a conceptual side view of the vehicle 201 of Comparative Example 2, to show displacement of the detection point r10 on the road surface R detected by the road surface condition detection sensor 205, when the vehicle 201 experiences a pitching motion, and FIG. 5B is an enlarged side view to show positional relationships between detection points r11, r12 and front wheel 202*r*, 202*l* in FIG. 5A for Comparative Example 2.

With the vehicle 201 of Comparative Example 2 experiencing a pitching motion about a pitch center 201*c*, as shown in FIG. 5A, the detection point r10 detected by the road surface condition detection sensor 205, when the vehicle 201 is in a standstill, displaces in a range between a detection point r11 and a detection point r12, as shown in FIG. 3B. This causes a distance s10 from the front wheels 202*r*, 202*l* to the detection point r10, as a detected road surface position, to be changed between a distance s11 to the detection point r11, as a detected road surface position, and a distance s12 to the detection point r12, as a detected road surface position, from the front wheels 202*r*, 202*l*.

Thus, in order to detect road surface conditions for accurate control, correction is required for a distance between the distance s11 to the detection point r11, as a detected road surface position, and the distance s12 to the detection point s12, as a detected road surface position, from the front wheels 202*r*, 202*l*, based on a difference from the distance s10 at the detection point r10.

Change in Distance from Front Wheel to Detection Point, when Vehicle of Present Embodiment Experiences Pitching Motion In contrast to Comparative Examples 1 and 2 as described above, the vehicle 1 of the present embodiment has a direction of radiating the laser beams rb, when obtaining information on conditions of the road surface R from the preview sensor 5*f*, set in line with the direction of the tangent c1*s* to the arc c1, about the pitch center c of the vehicle 1, at the detection point 5*s* on the arc c1, when the vehicle 1 (vehicle body 1*h*) in a standstill is viewed laterally. In other words, the direction of radiating the laser beams rb from the preview sensor 5*f* is orthogonal to a line (bold chain line in FIG. 2) connecting the detection point 5*s* on the arc about the pitch center c of the vehicle 1 with the pitch center c.

Figure 6A:
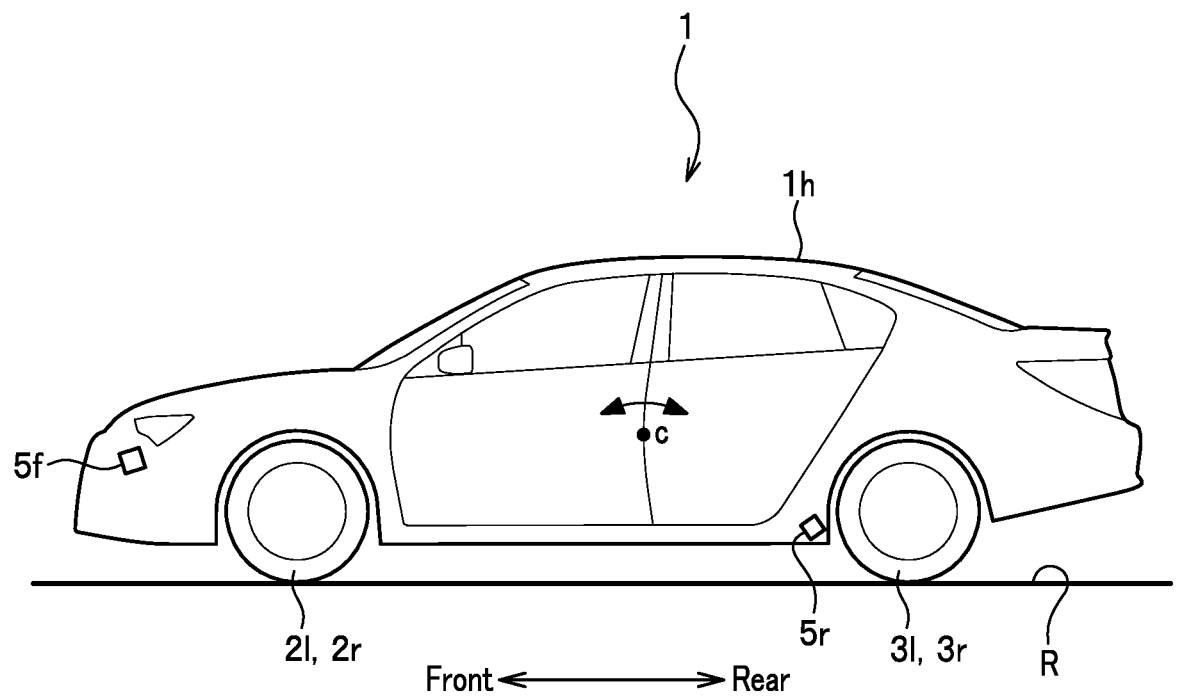
FIG. 6A is a conceptual side view of the vehicle according to the embodiment, experiencing a pitching motion about the pitch center.
Figure 6B:
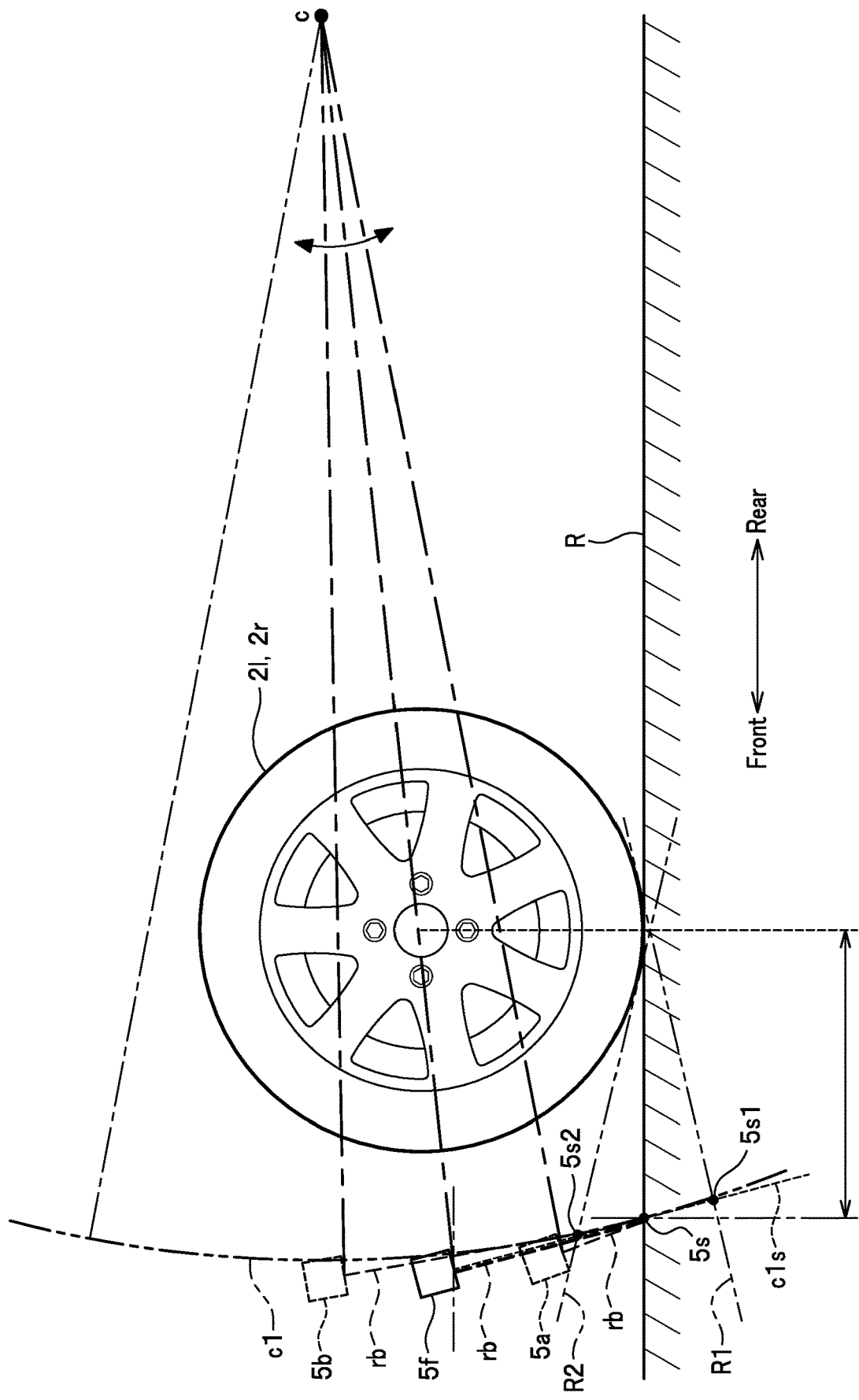
FIG. 6B is a conceptual side view of the vehicle according to the embodiment, experiencing a pitching motion, to show positional relationships between the pitch center, the front wheel, and the detection point detected by the preview sensor.

The preview sensors 5*f* are mounted in front of the front wheels 2*r*, 2*l* of the vehicle body 1*h* at positions overlapping with the front wheels 2*r*, 2*l*, as viewed from front, as shown in FIGS. 1A, 1B. FIG. 6A is a conceptual side view of the vehicle 1 according to the embodiment, experiencing a pitching motion about the pitch center c, and FIG. 6B is a conceptual side view of the vehicle 1 according to the embodiment, experiencing a pitching motion, to show positional relationships between the pitch center c, the front wheel 2*r*, 2*l*, and the detection point 5*s* detected by the preview sensor 5*f*.

When the vehicle 1 experiences a pitching motion due to conditions of the road surface R, the vehicle body 1*h* experiences a pitching motion about the pitch center c, as shown in FIG. 6A. The preview sensor 5*f* mounted to the vehicle body 1*h* also experiences a pitching motion about the pitch center c. For example, when the road surface R changes to a downhill road surface R1 with respect to the vehicle body 1*h*, the detection point 5*s* is displaced to a detection point 5*s*1 on the road surface R1, as shown in FIG. 6B. At this time, the preview sensor 5*f* pivots downward about the pitch center c to a position indicated as a preview sensor 5*a*. However, the front wheels 2*r*, 2*l* experience a pitching motion about the pitch center c and thus there is no change in distances between the front wheels 2*r*, 2*l* and the pitch center c.

When the entire vehicle 1 experiences a pitching motion about the pitch center c so as to take a dive, a displacement of the detection point 5*s* on the road surface R, due to the pitching motion, to the detection point 5*s*1 on the road surface R1 is minimal, with respect to the arc c1 about the pitch center c. Likewise, when the road surface R changes to an uphill road surface R2 with respect to the vehicle body 1*h*, the detection point 5*s* is displaced to a detection point 5*s*2 on the road surface R2. At this time, the preview sensor 5*f* pivots upward about the pitch center c to a position indicated as a preview sensor 5*b*. However, the front wheels 2*r*, 2*l* experience a pitching motion about the pitch center c so as to be raised, and thus there is no change in distances between the front wheels 2r, 2l and the pitch center c.

When the entire vehicle 1 experiences a pitching motion about the pitch center c so as to take a squat, a displacement of the detection point 5s on the road surface R, due to the pitching motion, to the detection point 5s2 on the road surface R2 is minimal, with respect to the arc c1 about the pitch center c.

Figure 7A:
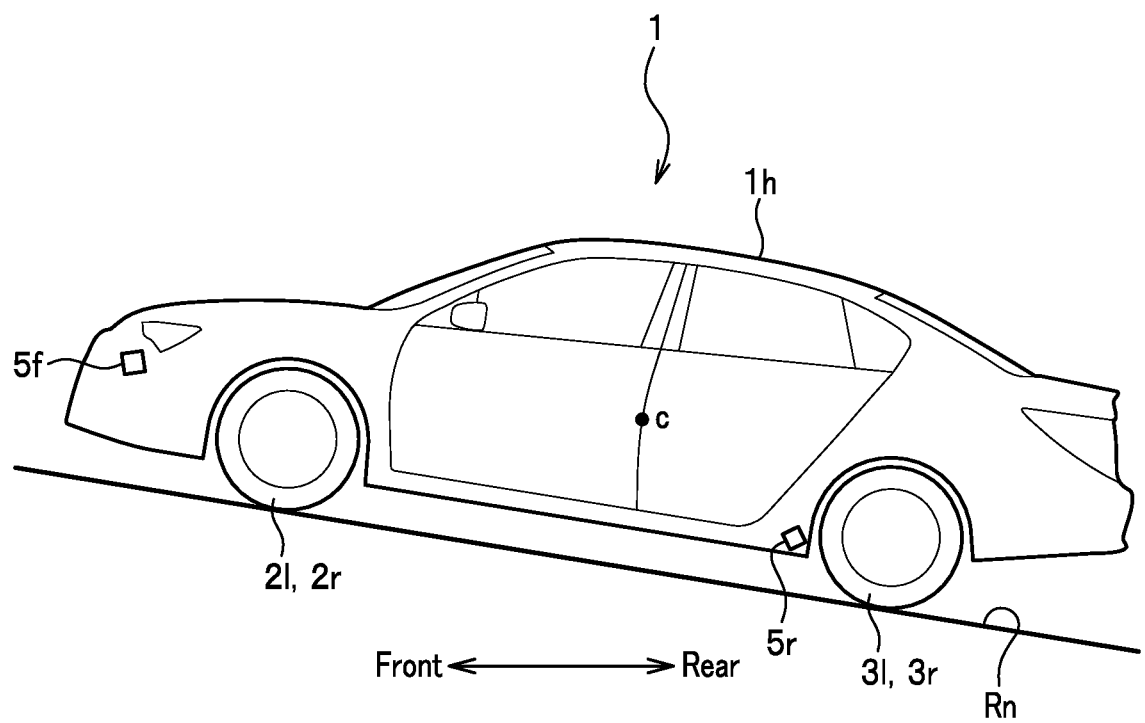
FIG. 7A is a conceptual side view of the vehicle traveling on an uphill road surface.
Figure 7B:
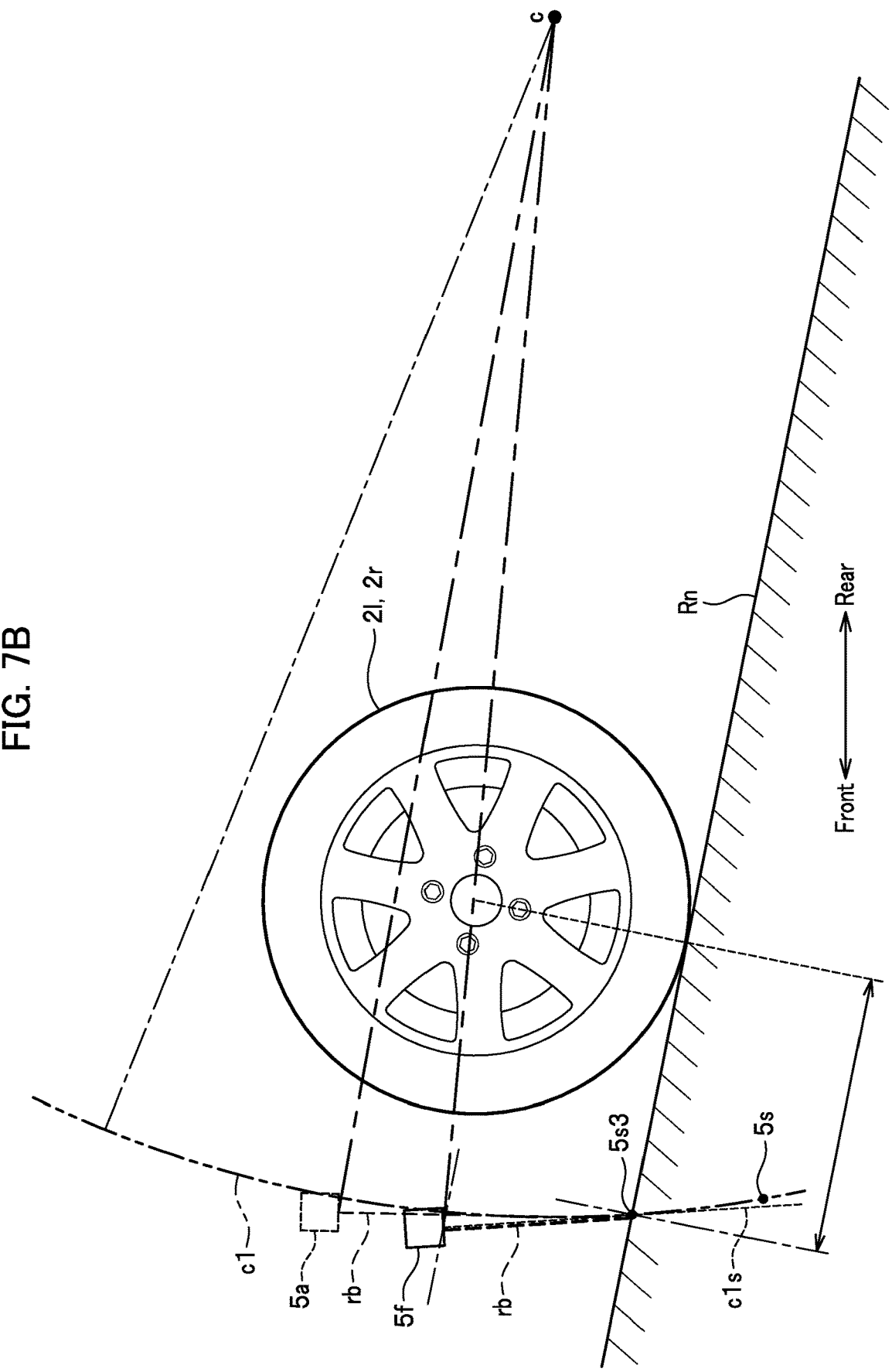
FIG. 7B is a conceptual side view of the vehicle traveling on the uphill road surface, to show positional relationships between the pitch center, the front wheel, and the detection point detected by the preview sensor.

FIG. 7A is a conceptual side view of the vehicle traveling on an uphill road surface Rn, and FIG. 7B is a conceptual side view of the vehicle 1 traveling on the uphill road surface Rn, to show positional relationships between the pitch center c, the front wheels 2r, 2l, and the detection point 5s detected by the preview sensor 5f.

When the vehicle 1 is traveling on the uphill road surface Rn, as shown in FIG. 7A, the preview sensor 5f (see FIGS. 1A, 1B), mounted on the vehicle body 1h on the flat road surface R, is displaced to a position indicated as the preview sensor 5a, as shown in FIG. 7B. A detection point 5s3 (see FIG. 7B) is the point detected by the preview sensor 5a on the uphill road surface Rn. When the road surface is the uphill road surface Rn, the vehicle 1 takes a squat. In this case, the positional relationships with the pitch center c and front wheels 2r, 2l of the vehicle body 1h are substantially not changed, as shown in FIG. 7B, between at the detection point 5s on the flat road surface R, detected by the preview sensor 5f, and at the detection point 5s3 on the uphill road surface Rn, detected by the preview sensor 5a.

Also when the vehicle 1 is traveling on a downhill road surface, the positional relationships with the pitch center c and front wheels 2r, 2l of the vehicle body 1h are substantially not changed, as in FIG. 7B, between at the detection point on the downhill road surface, detected by the displaced preview sensor 5f, and at the detection point 5s on the flat road surface R, detected by the preview sensor 5f. When the vehicle 1 travels on an inclined road surface, the vehicle 1 takes a squat or takes a dive, but the positional relationships from the detection point 5s3 on the uphill road surface Rn to the front wheels 2r, 2l remain substantially the same as those when the vehicle 1 travels on a flat road surface. As a result, when the vehicle 1 according to the embodiment experiences a pitching motion, the positional relationships between the detection point 5s (5s1, 5s2) and the front wheels 2r, 2l are substantially not changed, as compared with Comparative Example 1 in FIG. 3B and Comparative Example 2 in FIG. 5B.

According to the above-described embodiment, the direction of radiating the laser beams rb from the preview sensors 5f is inclined in that of the tangent to the arc c1, about the pitch center c of the vehicle 1, at the detection point 5s, as shown in FIGS. 1A and 2. Accordingly, even when the vehicle 1 experiences a pitching motion or travels on the inclined road surface Rn, as shown in FIGS. 7A and 7B, an error in changes in a distance between the detection point 5s1, 5s2, or 5s3 on the road surface R or Rn and the front wheels 2r, 2l is reduced to improve controllability. In addition, no need of correcting an error, in changes in a distance between the detection point 5s1, 5s2, or 5s3 on the road surface R or Rn and the front wheels 2r, 2l, reduces a load in calculation.

Likewise, the direction of radiating the laser beams rb from the preview sensors 5r is inclined in that of the tangent to the arc c2, about the pitch center c of the vehicle 1, at the detection point 5sr, as shown in FIG. 1A. Accordingly, even when the vehicle 1 experiences a pitching motion or travels on the inclined road surface Rn, as in FIG. 7B, an error in changes in a distance between a detection point on the road surface R or Rn and the rear wheels 3r, 3l is reduced to improve controllability.

In addition, no need of correcting an error, in changes in a distance between the detection point on the road surface R or Rn and the rear wheels 3r, 3l, reduces a load in calculation.

Modifications

The present invention is not limited to the above-described embodiment, and various modifications are possible within the scope of appended claims

LIST OF REFERENCE SIGNS

1: vehicle, 1h: vehicle body, 2l: left front wheel (front wheel), 2r: right front wheel (front wheel), 3l: left rear wheel (rear wheel), 3r: right rear wheel (rear wheel), 5f; 5r: preview sensor (road surface condition detector), 5s; 5sr: detection point, c: pitch center, c1; c2: arc, c1s; c2s: tangent, R; Rn: road surface, and rb: laser beams (radiation direction).

What is claimed is:

1. A vehicle with road surface condition detector, comprising:
   a vehicle body;
   front and rear wheels configured to move the vehicle body; and
   a road surface condition detector configured to detect road surface conditions in front of each of the front wheels,
   wherein the road surface condition detector is positioned in front of each of the front wheels, and
   the road surface condition detector is set to radiate laser beams, for detecting a detection point on a road surface, in a direction of a tangent line to an arc centered at a pitch center of the vehicle body, at the detection point.

2. A vehicle with road surface condition detector, comprising:
   a vehicle body;
   front and rear wheels configured to move the vehicle body; and
   a road surface condition detector configured to detect road surface conditions in front of each of the rear wheels,
   wherein the road surface condition detector is positioned in front of each of the rear wheels, and
   the road surface condition detector is set to radiate laser beams, for detecting a detection point on a road surface, in a direction of a tangent line to an arc centered at a pitch center of the vehicle body, at the detection point.

* * * * *